United States Patent [19]

Ruefenacht

[11] 3,727,995

[45] Apr. 17, 1973

[54] BEARING SYSTEM FOR BALANCE KNIFE EDGES AND SCALE PIVOTS

[76] Inventor: Werner Russell Ruefenacht, 2650 South West Temple, Salt Lake City, Utah 84115

[22] Filed: Sept. 1, 1971

[21] Appl. No.: 177,057

[52] U.S. Cl. .............................. 308/2 R, 177/DIG. 9
[51] Int. Cl. ................................................ F16c 11/00
[58] Field of Search ........................... 308/2 R, 2 A; 177/DIG. 9

[56] References Cited

UNITED STATES PATENTS

| | | | |
|---|---|---|---|
| 2,256,318 | 9/1941 | Hadley | 177/DIG. 9 |
| 2,552,826 | 5/1951 | Van Duyn | 308/2 R |
| 1,146,794 | 7/1915 | Hopkinson | 308/2 R |
| 1,583,251 | 4/1926 | Hein | 308/2 R |
| 2,387,202 | 10/1945 | Williams | 308/2 R |
| 2,013,539 | 9/1935 | Gilbert | 308/2 R |
| 3,387,898 | 6/1968 | Hadley | 177/DIG. 9 |
| 3,401,964 | 9/1968 | Johnson | 308/72 |

*Primary Examiner*—Charles J. Myhre
*Assistant Examiner*—R. H. Lararus
*Attorney*—Lynn G. Foster

[57] ABSTRACT

A bearing system comprising two or more cylindrical bearing members positioned in tandem relation and having the axes thereof extending parallel to, but offset from, each other for supporting a knife edge or pivot therebetween. Support means for the bearing members is disclosed which permits limited pivotal movement of the bearing members to provide uniform support over the entire length of the knife edge.

4 Claims, 10 Drawing Figures

PATENTED APR 17 1973 3,727,995

INVENTOR.
WERNER RUSSELL RUEFENACHT
BY
ATTORNEY

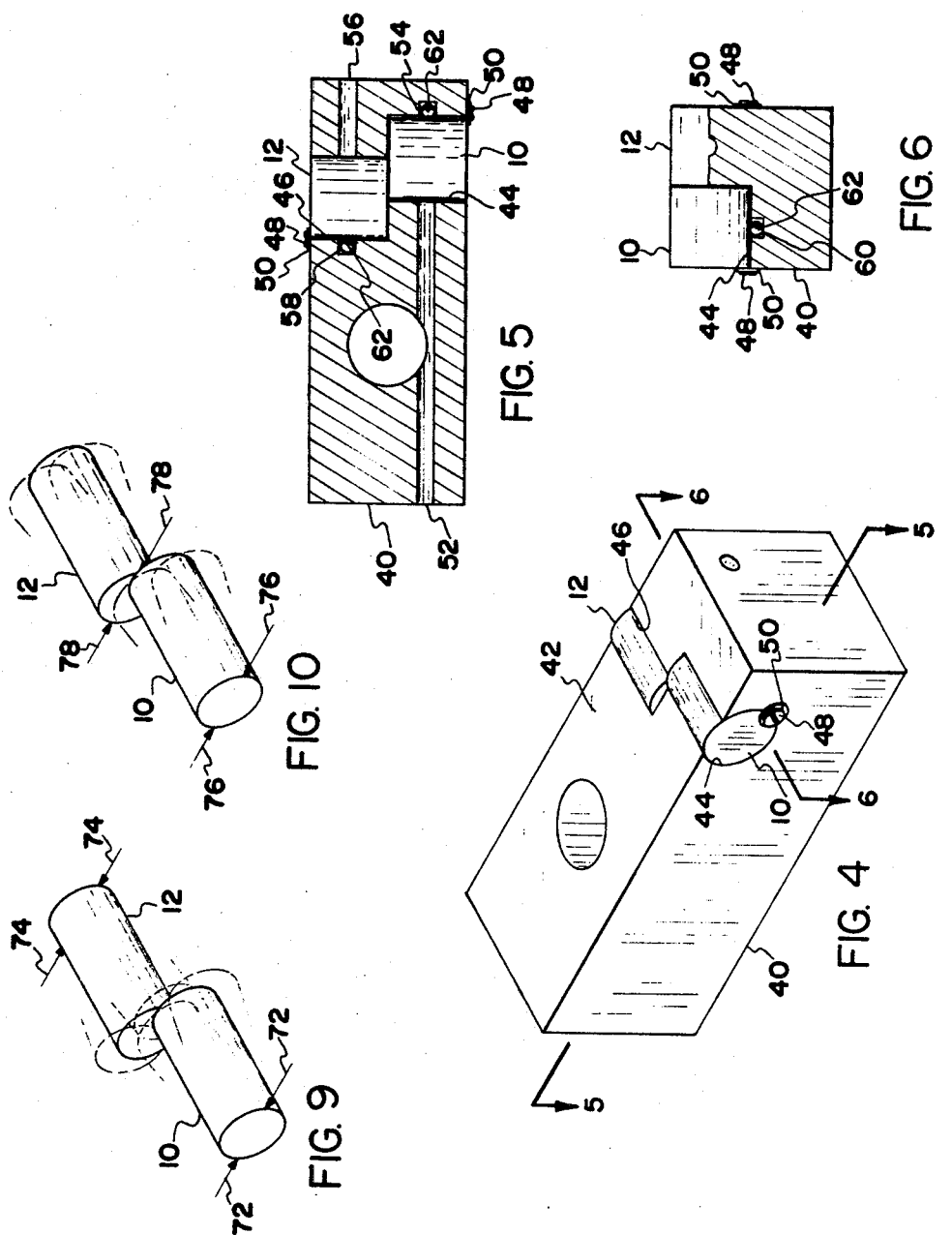

BEARING SYSTEM FOR BALANCE KNIFE EDGES AND SCALE PIVOTS

BACKGROUND

1. Field of Invention

This invention relates to bearings and is particularly directed to bearing systems for balanced knife edges and scale pivots, as are employed in weighing devices and the like.

2. Prior Art

The manufacture of weighing devices, such as balances and scales, is probably one of the oldest arts known to man. Throughout the history of this art, there has been a ceaseless quest for greater accuracy which, in turn, has led to a continuing search for improved bearing systems. The use of knife edges has long been conventional for precision balances and scales. However, the search has continued for improved surfaces upon which the knife edges must bear. Up to the present time, knife edges were made to bear on flat, grooved, or V-shaped bearings. The grooved or V-shaped bearings have been particularly employed in situations wherein it is important to attempt to maintain the oscillating balance or scale beam in alignment with the balance or scale as a whole; for example, where optical readout mechanisms are employed. However, such grooved or V-shaped bearings are difficult to finish to a fine bearing surface. Moreover, the V-shaped bearings, if finely finished to close tolerances, prevent oscillation of the knife edge or pivot due to the tight fit, or, if not finely finished, fail to completely maintain the alignment of the oscillating member because of lack of close tolerances. Grooved bearings also do not completely maintain the alignment.

BRIEF SUMMARY AND OBJECTS OF THE INVENTION

These disadvantages of the prior art are overcome with the present invention and a novel bearing is provided which completely maintains the alignment of the oscillating member while providing substantially friction-free support uniformly along the entire length of edge or pivot.

In accordance with the present invention, a novel bearing system is provided which presents essentially a low friction line bearing surface to the knife edge, yet is relatively inexpensive to produce, and is self-adjusting to maintain the knife edge in alignment with the weighing device as a whole.

The advantages of the present invention are preferably attained by providing a bearing system comprising two or more spaced cylindrical bearing members wherein the bearing members are mounted with the longitudinal axes thereof extending substantially parallel to, but slightly offset laterally from, each other. The bearing members of each pair are secured in a manner such that they each have a limited amount of freedom to permit self-adjustment to the knife edge.

Accordingly, it is an object of the present invention to provide improved bearing systems for weighing devices and the like.

Another object of the present invention is to provide improved bearing surfaces for use in knife edge beam balances, scales and the like.

A further object of the present invention is to provide a bearing system for knife edges which is self-adjusting to the lay of the knife edge.

An additional object of the present invention is to provide improved bearing surfaces for maintaining an oscillating member in alignment with the weighing device as a whole.

A specific object of the present invention is to provide a bearing system for knife edges comprising two or more spaced cylindrical bearing members wherein each bearing member is mounted with its longitudinal axis extending substantially parallel to, but slightly offset laterally from, each other bearing member and wherein each bearing member is secured in a manner such that it has a limited amount of freedom to permit self-adjustment to align itself with the knife edge.

These and other objects and features of the present invention will be apparent from the following detailed description, taken with reference to the accompanying drawings.

BRIEF DESCRIPTION OF THE DRAWINGS

FIG. 4 is an isometric view of a modified form of the bearing surface of the bearing system of FIG. 1;

FIG. 5 is a horizontal section through the bearing surface of FIG. 4, taken on the line 5—5 thereof;

FIG. 6 is a transverse section through the bearing surface of FIG. 4, taken on the line 6—6 thereof, with parts broken away for clarity; and FIGS. 7-10 are diagrammatic representations showing the freedom of movement of the bearing members of the bearing system of FIG. 1 when subjected to restrain at respective points.

DETAILED DESCRIPTION OF THE ILLUSTRATED EMBODIMENT

Figure 1:
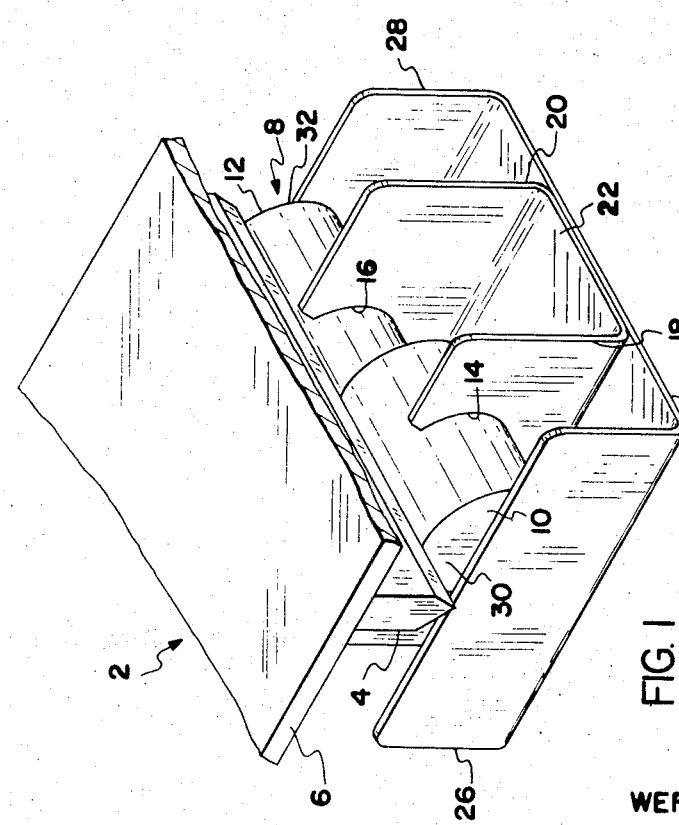
FIG. 1 is an isometric view of a knife edge bearing system embodying the present invention, with parts broken away for clarity.

In that form of the present invention chosen for purposes of illustration in FIG. 1, a bearing system, indicated generally at 2, comprises a knife edge 4 supporting a balance arm 6, or the like, engaging a bearing surface, indicated generally at 8, formed by a pair of cylindrical bearing members 10 and 12. It will be apparent that, if desired, more than two tandem bearing members could be employed. However, for purposes of brevity, the following description refers to two bearing members only. The bearing members 10 and 12 are mounted in respective recesses 14 and 16 formed in the opposite arms 18 and 20 of a generally U-shaped support 22. A second, generally U-shaped member 24 has upwardly extending arms 26 and 28 which extend adjacent the free ends 30 and 32 of the bearing members 10 and 12 to permit limited axial movement of the bearing members 10 and 12.

Figure 2:
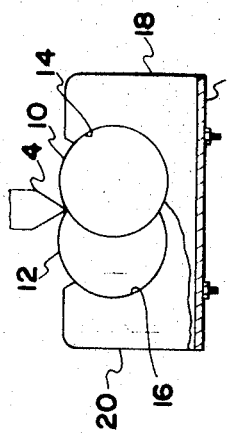
FIG. 2 is an end view of the bearing system of FIG. 1, with parts broken away for clarity.
Figure 3:
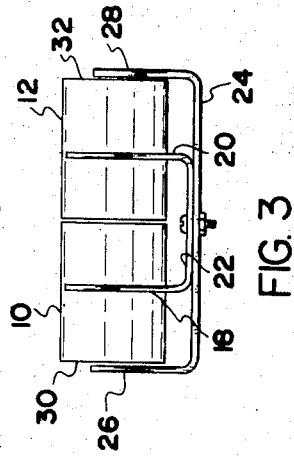
FIG. 3 is a side view of the bearing surface of the bearing system of FIG. 1.

As best seen in FIGS. 2 and 3, the bearing members 10 and 12 are mounted in tandem with the longitudinal axes thereof extending parallel to, but offset from, each other. The arms 18 and 20 of support 22 engage the bearing members 10 and 12 midway of the length of the bearing members 10 and 12 and recesses 14 and 16 are formed generally circular and are dimensioned to provide a sliding fit with the bearing members 10 and 12. As shown, the recesses 14 and 16 follow the periphery of the bearing members 10 and 12 to a point well above the horizontal diameter of the bearing members 10 and 12 and, hence, provide both vertical and lateral restraint of the bearing members 10 and 12. However, the recesses 14 and 16 are open at the upper ends thereof and the bearing members 10 and 12 project slightly beyond the upper ends of the recesses 14 and 16 to provide uninterrupted engagement with the knife edge 4. As best seen in FIGS. 1 and 3, the knife edge 4 extend parallel to the axes of the bearing members 10 and 12 and is supported by the upper surfaces of the bearing members 10 and 12. It will be apparent that, as seen in FIG. 2, bearing member 10 engages only the right side of knife edge 4 and, hence, urges knife edge 4 toward the left, while bearing member 12 engages only the left side of knife edge 4 and, thus, urges knife edge 4 toward the right. This provides a force couple which tends to rotate knife edge 4. However, this tendency is compensated by providing a second bearing system, not shown, which is identical to bearing system 2 but is spaced therefrom along knife edge 4. Obviously, knife edge 4 need not be continuous between the two bearing systems, provided that the knife edges of the two spaced bearing systems are colinear. In this instance, the force couples provided by the bearing systems will compensate through the balance arm 6. On the other hand, it will be seen that the pressure of knife edge 4 is applied substantially tangentially along the length of each of the bearing members 10 and 12.

Figure 8:
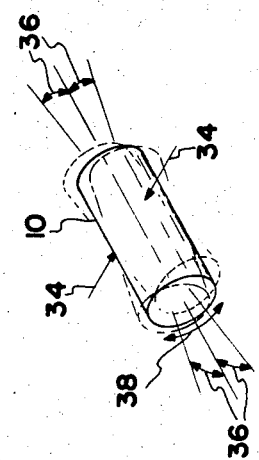

Referring to FIG. 8, momentarily, it has been pointed out above, that recesses 14 and 16 and arms 18 and 20 of support 22 serve to restrain vertical and lateral movement of the midpoints of bearing members 10 and 12. This restraint is represented, in FIG. 8, by arrows 34, as applied to bearing member 10. At the same time, it has been stated that the arms 26 and 28 of U-shaped member 24 permit limited axial movement of the bearing members 10 and 12. Obviously, axial movement of either of the bearing members 10 or 12 away from arms 26 and 28 will be limited by engagement with the other bearing member 12 or 10. However, this limited axial movement, coupled with the centrally applied vertical and lateral restraint, represented by arrows 34, permits each of the bearing members 10 and 12 to pivot about its midpoint, as indicated by arrows 36, and to rotate about its axis, as indicated by arrow 38. Thus, each of the bearing members 10 and 12 enjoys considerable freedom of movement and, thus, can readily accommodate movement of knife edge 4 without varying the alignment of the knife edge 4.

FIGS. 4, 5 and 6 illustrate a modified form of the bearing surface 8 of the present invention. In this form of the invention, a bearing support block 40 is provided. The upper surface 42 of support block 40 is formed with a pair of intersecting recesses 44 and 46 conforming substantially to the shape and desired orientation of the bearing members 10 and 12, which are identical to those of FIGS. 1–3. A pair of screws 48, carrying washers 50, are secured to the block 40 and overlap the recesses 44 and 46 to provide limited axial movement of the bearing members 10 and 12. A longitudinal bore 52 communicates with recess 44 and extend from one end of block 40 to a point slightly beyond the recess 44, thereby providing a horizontal recess 54 communicating with recess 44. Similarly, a second longitudinal bore 56 communicates with recess 46 and extends from one end of block 40 to a point slightly beyond recess 46, thereby providing a horizontal recess 58 communicating with recess 46. In addition, vertical recesses communicating with the recesses 44 and 46 are provided, as seen at 60 in FIG. 6. A plurality of spheres 62 are provided, each located in a respective one of the recesses 54, 58 and 60 and are dimensioned so as to project slightly into the adjacent recess 44 or 46. The recesses 44 and 46 are of slightly greater diameter than the bearing members 10 and 12 and, hence, serve to provide vertical and lateral restraint for the bearing members 10 and 12. However, spheres 62 provide point supports for the bearing members 10 and 12 so that the bearing members 10 and 12 are free to pivot about the spheres 62 in substantially the manner described with respect to FIG. 8. If desired, cylindrical or polygonal shaped members may be substituted for the spheres 62, so long as they provide point support for the bearing members 10 and 12.

Figure 7:
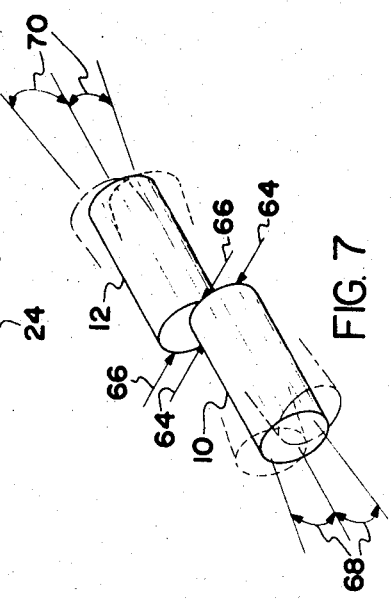

FIGS. 7, 8, 9 and 10 represent alternative manners in which the bearing members 10 and 12 may be restrained, while providing pivotal freedom of movement, as previously described with respect to FIG. 8, to accommodate variations in the pressure applied by the knife edge and the manner in which such pressure is applied. As seen in FIG. 7, restraints are applied to the adjacent ends of bearing members 10 and 12, as indicated by arrows 64 and 66, respectively, while the opposite ends of the bearing members 10 and 12 are free to pivot, as indicated by arrows 68 and 70, respectively. In FIG. 9, the adjacent ends of the bearing members 10 and 12 are free to pivot, while the opposite ends thereof are restrained, as indicated by arrows 72 and 74, respectively. In FIG. 10, the proximal end of each of the bearing members 10 and 12 are restrained, as indicated, respectively, by arrows 76 and 78, while the distal ends of each of the bearing members 10 and 12 are free to pivot.

Obviously, numerous variations and modifications may be made without departing from the present invention. Accordingly, it should be clearly understood that the forms of the present invention described above and shown in the accompanying drawings are illustrative only and are not intended to limit the scope of the invention.

What is claimed is:

1. A bearing system comprising:
    at least two of cylindrical bearing members disposed in tandem relation and having the axes thereof extending essentially parallel to, but laterally displaced from, each other,
    first and second point support means contiguous with each said cylindrical bearing members to which the load from said contiguous cylindrical bearing is transferred, each point support means permitting limited yaw axial reorientation of said contiguous bearing members, and
    a knife edge member having an axis essentially parallel to and intermediate of the axes of the cylindrical bearing members and imposing a load on said cylindrical bearing members and to said point support means along said knife edge axis in a direction substantially normal thereto causing yaw axial reorientation of the cylindrical bearing members until the axis of each is precisely parallel to the adjacent knife edge axis.

2. The bearing system of claim 1 wherein said support means comprises:

a generally U-shaped support having the upwardly extending arms thereof respectively engaging said bearing members along one radial location each substantially midway of the length of the contiguous bearing member and receiving each said bearing member in a generally circular open-topped recess formed in said respective arms.

3. The bearing system of claim 1 wherein said point support means comprises:

a block having open-topped recesses formed in the upper surface thereof receiving said bearing members and conforming substantially to the shape and desired orientation of said bearing members but of slightly greater diameter than said bearing members, horizontal and vertical recesses formed in said block and communicating with said open-topped recesses, and point support members positioned in each of said horizontal and vertical recesses and projecting into said open-topped recesses to engage the adjacent cylindrical bearing member.

4. The bearing system of claim 1 wherein said point support means comprise spheres.

* * * * *